No. 727,716. PATENTED MAY 12, 1903.
J. B. UREN.
NUT LOCK.
APPLICATION FILED JULY 11, 1902.
NO MODEL. 2 SHEETS—SHEET 1.
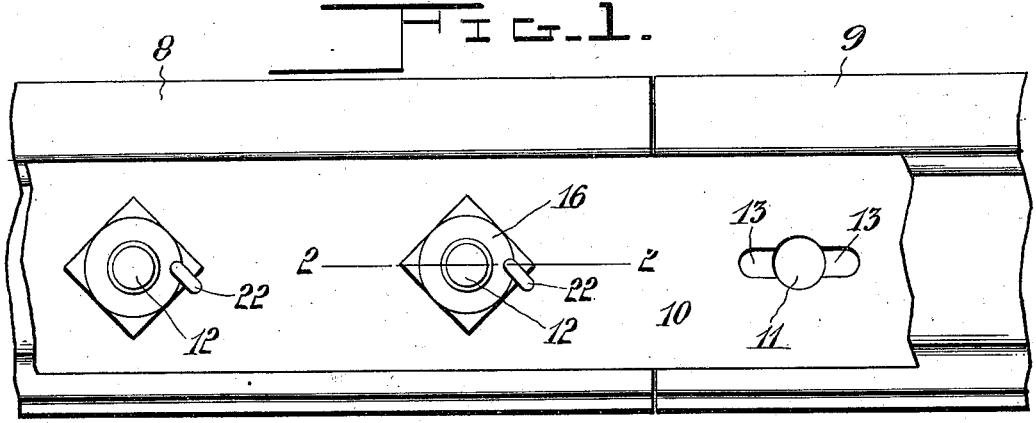
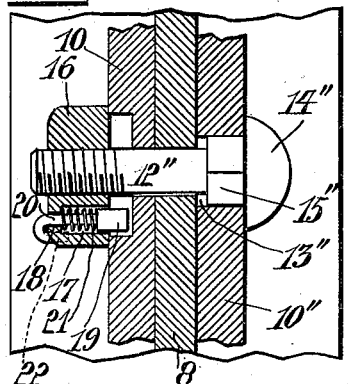
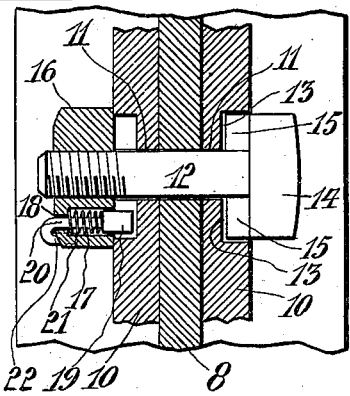
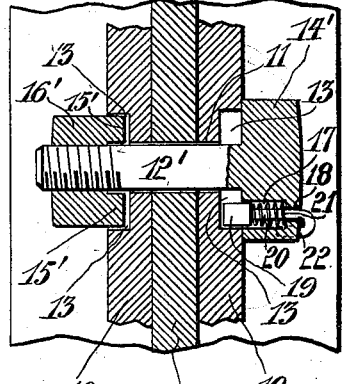
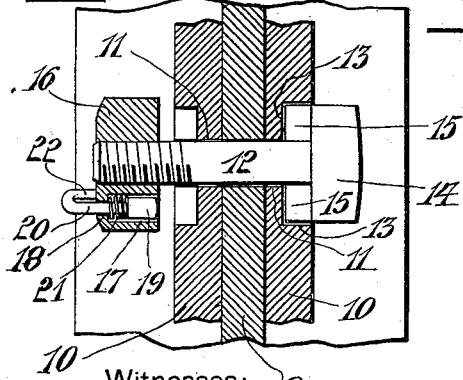
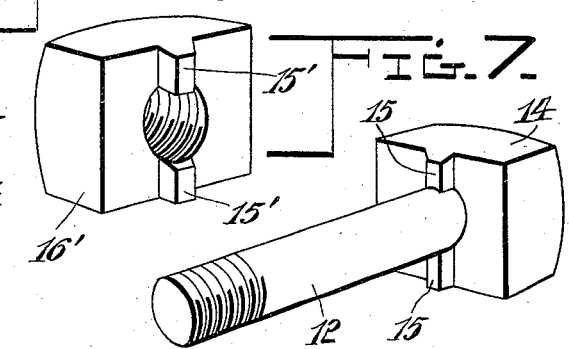
Witnesses: James B. Uren, Inventor,
By Marion & Marion
Attorneys No. 727,716. PATENTED MAY 12, 1903.
J. B. UREN.
NUT LOCK.
APPLICATION FILED JULY 11, 1902.
NO MODEL. 2 SHEETS—SHEET 2.
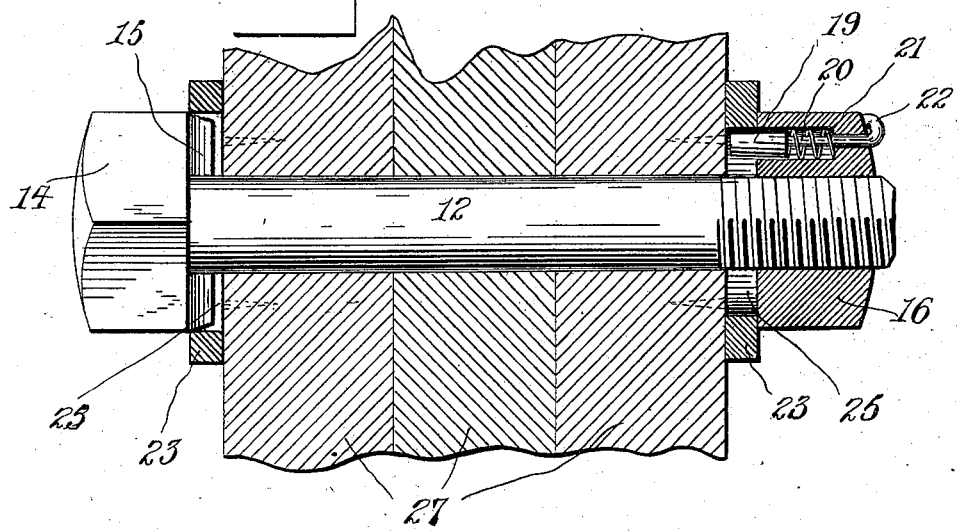
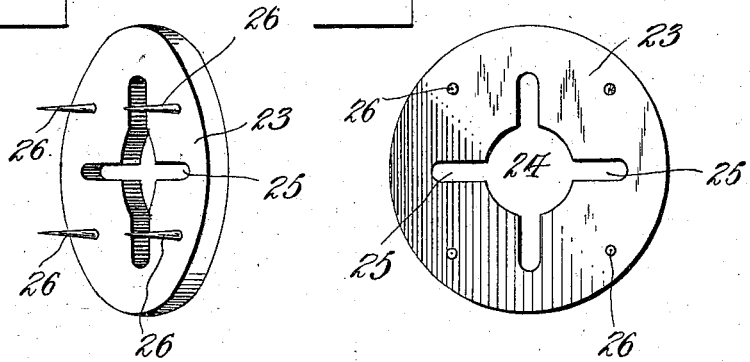
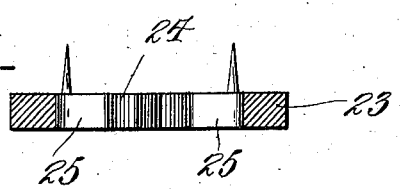
Witnesses: James B. Uren, Inventor,
By Marion & Marion
Attorneys No. 727,716.

Patented May 12, 1903.

UNITED STATES PATENT OFFICE.

JAMES BOTTRELL UREN, OF LILLOOET, CANADA.

NUT-LOCK.

SPECIFICATION forming part of Letters Patent No. 727,716, dated May 12, 1903.

Application filed July 11, 1902. Serial No. 115,116. (No model.)

*To all whom it may concern:*

Be it known that I, JAMES BOTTRELL UREN, a subject of the King of Great Britain, residing at Lillooet, county of Cariboo, Province of British Columbia, Canada, have invented certain new and useful Improvements in Nut-Locks; and I do hereby declare that the following is a full, clear, and exact description of the invention, such as will enable others skilled in the art to which it appertains to make and use the same.

My invention relates to nut-locks; and my object is to provide a simple device of this kind which will be efficient and reliable in operation.

The invention is expected to be practically applicable for use in connection with rail-joints and in similar situations.

My invention further consists in the construction and combination of parts hereinafter described, and more particularly pointed out in the claim.

In the drawings accompanying this application I have illustrated several embodiments of my invention to show the principle thereof, and herein—

Figure 1 is a side elevation of a rail-joint provided with my improvement. Fig. 2 is a horizontal section taken on the line 2 2 of Fig. 1. Fig. 3 is a similar section to Fig. 2, but showing a slightly-modified form of my improved nut-lock. Fig. 4 is a similar view to Figs. 2 and 3, showing a further modified form. Fig. 5 is a view similar to Fig. 2, showing the nut in the position in which it is placed in the act of screwing up. Fig. 6 is a perspective view of the nut used in Fig. 3. Fig. 7 is a similar view of the bolt used in Fig. 2. Fig. 8 is a longitudinal section through a bolt provided with my improved nut-lock as applied upon wood, showing the improved lock-washer I use for that purpose. Fig. 9 is a perspective view of the lock-washer. Fig. 10 is a side view thereof from the inner side, and Fig. 11 is a central transverse section through the washer.

The same numerals of reference denote like parts in all the figures of the drawings.

In Fig. 1 are shown the abutting ends of two rails 8 and 9, which are joined by fish-plates 10 of the ordinary or any desirable pattern. These fish-plates and the rail ends have, as usual, transverse apertures 11, through which pass the track-bolts 12, and at each side of the apertures 11 in the fish-plates I preferably provide niches or recesses 13, which are adapted to receive projecting parts on the head and nut, respectively, of the track-bolt 12, as will be presently seen.

In the form illustrated in Fig. 2 of my invention the bolt 12 is provided with a head 14, having a pair of inwardly-projecting diametrically opposite snugs 15, which are adapted to be seated in the recesses 13 of the fish-plates 10, thus holding the bolt against turning. Over the threaded end of the bolt fits a nut 16, which has a cylindrical recess 17 bored from the inner side in one corner thereof and extending nearly through to the outer side of the nut. This recess 17 is connected with the outer side of the nut by a smaller bore 18, and within the said recess is fitted the latch-bolt 19, which is adapted to reciprocate therein and is provided with a reduced shank 20, adapted to reciprocate in the bore 18. Around the shank 20 and within the recess 17 is seated a coiled spring 21, which is adapted to press against the head 19 of the bolt and against the bottom of the said recess, whereby to keep the head projected outwardly beyond the inner surface of the nut. The shank 20 of the bolt is carried out at its end, and after it has been inserted in place the projecting end is doubled on itself to form a recurved tongue 22, which is parallel to the shank 20, but at a sufficient distance therefrom to permit the tongue 22 to slide over the edge of the nut, as shown in Fig. 2; but the tongue 22 is cut off at such a point that when the bolt 19 is retracted completely within the recess 17 the butt-end of the tongue 22 is adapted to rest against the outer face of the nut, as shown in Fig. 5, thus retaining the bolt 19 in this position and out of the way. This is the position which the bolt 19 occupies when the nut 16 is being screwed up into place; but when the latter has been sufficiently tightened and brought into position, as shown in Fig. 2, then the bolt 19 is rotated until the tongue 22 projects over the side of the nut, and thereupon as soon as the nut has been turned a short distance, less than a half-revolution, the latch-bolt 19 will drop into one of the two niches 13, and thereby the nut 16 is securely locked against turning, and by reason of the snugs 15, formed on the bolt, neither the bolt nor nut can be turned relatively to one another or the rail.

In case it is desired to unscrew the bolt this can readily be done by simply lifting the bolt 19 by means of its tongue 22 and turning the latter until it rests upon the outer face of the nut; but this can never happen accidentally, whereby the nuts are held with absolute security in their place and cannot by any accidental means work loose.

Instead of arranging the latch-bolt 19 on the nut it may equally well be arranged on the head 14' of the bolt 12', as shown in Fig. 3, and in this case the nut 16' is formed with a pair of inwardly-projecting snugs 15', which are adapted to be seated in the recesses 13, so as to prevent the nut from turning therein. In this case the bolt is screwed up by turning the head 14', while the nut 16' remains stationary, and the bolt 19 is operated in the same manner as before.

In Fig. 4 I have shown my improved nut-lock as applied to an ordinary track-bolt 12'', which has the usual cup-head 14'', and beneath the same it is provided with a square shoulder 15'', which is prevented from turning by being seated in the square aperture 13'' of the fish-plate 10'', which is necessarily formed somewhat differently from the fish-plate 10 in this instance.

In those cases in which the nut-lock is used for joining pieces of wood I prefer to use a special lock-washer (indicated by the numeral 23) at each end of the bolt, which washer forms the intermediary connection between the wood itself and the snugs 15 or the latch-bolt 19 and forms seats for the latter. This washer 23 has besides the central aperture 24 for the shank of the bolt 12 a set of radial notches or slots 25, which are of the proper size to permit the entrance therein of the snugs 15 or of the latch-bolt 19, as the case may be, and the lock-washer also has on its inner face a series of axially-projecting points 26, which are raised thereon or struck therefrom by depressing a part of the surface from the outer side of the washer, as may be found most convenient, it being understood that the washer 23 is thick enough to permit the snugs 15 to be entirely seated therein and to raise them clear of the wood.

In screwing up the bolt the washer 23 is inserted under the head 14 and also under the nut 16 thereof on each side of the wooden pieces 27 which are to be secured together, after which the nut 16 is put on the screw-threaded end of the bolt, and in turning it up in place the points 26 are caused to bite into the surface of the wood and become embedded therein, or, if preferable, they may be hammered down around the bolt-hole before inserting the bolt. When the bolt is screwed up in place, the snugs 15 of the head are seated in the slots of one washer and the latch-bolt 19 is adapted to drop into the same slots on the other washer, and in this case the two washers being firmly embedded in the wood are prevented from turning, and they in turn hold the bolt and nut, respectively, against turning thereon.

By the use of my improved nut-lock on rail-joints the necessity of a section-gang specially employed for tightening the nuts of track-bolts is absolutely avoided, because, as above pointed out, it is absolutely impossible for this bolt to work loose. The improvement is one which can readily and cheaply be applied to any ordinary nut or bolt and which will be seen to embody advantages in the way of security and cheapness not possessed by by any other nut.

While I have shown in the accompanying drawings the preferred form of my invention, it will be understood that I do not limit myself to the precise form shown, for many of the details may be changed in form or position without affecting the operativeness or utility of my invention, and I therefore reserve the right to make all such modifications as are included within the scope of the following claim or of mechanical equivalents to the structures set forth.

Having thus described my invention, what I claim as new and desire to secure by Letters Patent, is—

In a nut-lock, in combination, a bolt having a head with lugs upon the under face thereof, a nut adapted to be attached to the extremity of said bolt, plates carried respectively between said head and said nut, each of said plates comprising integral spikes on the inner faces thereof, said spikes being disposed at points well within the periphery of said plates, said plates further comprising a central opening adapted to pass the body of said bolt, and radial slots, said nut having a recess substantially parallel to the axis thereof, a pin mounted in said recess, a spring constraining said pin toward the inner face of said nut, said slots being adapted to receive the extremity of said pin and said lugs, substantially as described.

In witness whereof I have hereunto set my hand in the presence of two witnesses.

JAMES BOTTRELL UREN.

Witnesses:
ALEX. MCARTHUR,
DUNCAN MCDONALD.